Aug. 2, 1966 M. J. REAVES 3,264,411

TELEPHONE CONFERENCE SYSTEMS

Filed April 5, 1963 3 Sheets-Sneet 1

INVENTOR
Michael John Reaves, Jr.

BY E. Hastings Ackley
Walter J Jagmin
ATTORNEYS

TELEPHONE CONFERENCE SYSTEMS

Filed April 5, 1963 3 Sheets-Sheet 2

INVENTOR
Michael John Reaves, Jr.

BY Es Hastings Adeley and Walter J. Jagmin
ATTORNEYS

Aug. 2, 1966 M. J. REAVES 3,264,411

TELEPHONE CONFERENCE SYSTEMS

Filed April 5, 1963 3 Sheets-Sheet 3

INVENTOR
Michael John Reaves, Jr.

BY Eyspustiness Adeley and Walter J. Jagmin

ATTORNEYS

United States Patent Office 3,264,411
Patented August 2, 1966

3,264,411
TELEPHONE CONFERENCE SYSTEMS

Michael John Reaves, 6535 Le Loache St., Dallas, Tex.
Filed Apr. 5, 1963, Ser. No. 270,926
5 Claims. (Cl. 179—1)

This invention relates to telephone systems in which the subscriber has one or more stations or instruments and a plurality of lines and more particularly to a conference means for such telephone systems enabling a subscriber to establish connections with two of such lines whereby a subscriber may join himself and parties on two different lines in a three-way conference connection.

An object of this invention is to provide an easily installed means connectable to the subscribers' telephone system instruments for selectively establishing connection at a particular instrument with any two of a plurality of lines terminated at such instrument whereby a three-way conference may be established by the subscriber.

Still another object is to provide conference establishing means for connecting two of the lines with the receiver and transmitter circuit of one of the subscriber's instruments which is operable solely under the control of the subscriber at such instrument.

A further object is to provide a conference means connectable to a pair of instruments enabling a subscriber to use one instrument to establish communication with one of the plurality of lines and another instrument to establish communication with another of the plurality of lines, the conference means being operable to connect the two selected lines of the two instruments whereby the subscriber at either of the two instruments may hold a three-way conference connection with the two parties on the two different lines.

A still further object is to provide a conference means attachment for a subscriber's instrument, the instrument having a plurality of key means by which a subscriber may establish communication over any one of a plurality of lines and having holding means for holding an incoming call on any one of the plurality of lines, for enabling the subscriber to establish connection at the instrument with a line held by the holding means and another line so that the subscriber may join himself and parties on the two lines terminating at such instrument in a three-way conference.

A still further object is to provide an attachment for a subscriber's instrument having inductive means for interconnecting any two of a plurality of lines terminating at the subscriber's instruments and switch means operable by a person at the instrument for controlling the interconnection of such lines by such inductive means.

Another object is to provide a conference means for a key telephone system having a number of subscriber stations or instruments each having access to a plurality of lines and having control means whereby any number of the subscriber stations or instruments may be selectively and simultaneously connected to the same line, the conference means interconnecting two of such lines so that parties at one or more of the instruments may engage in conversation with parties on two different lines whereby a conference may be held at one or more of the subscriber instruments with two parties on two different lines.

Additional objects and advantages of the invention will be readily apparent from the reading of the following description of a device constructed in accordance with the invention, and reference to the accompanying drawings thereof, wherein.

Figure 3:
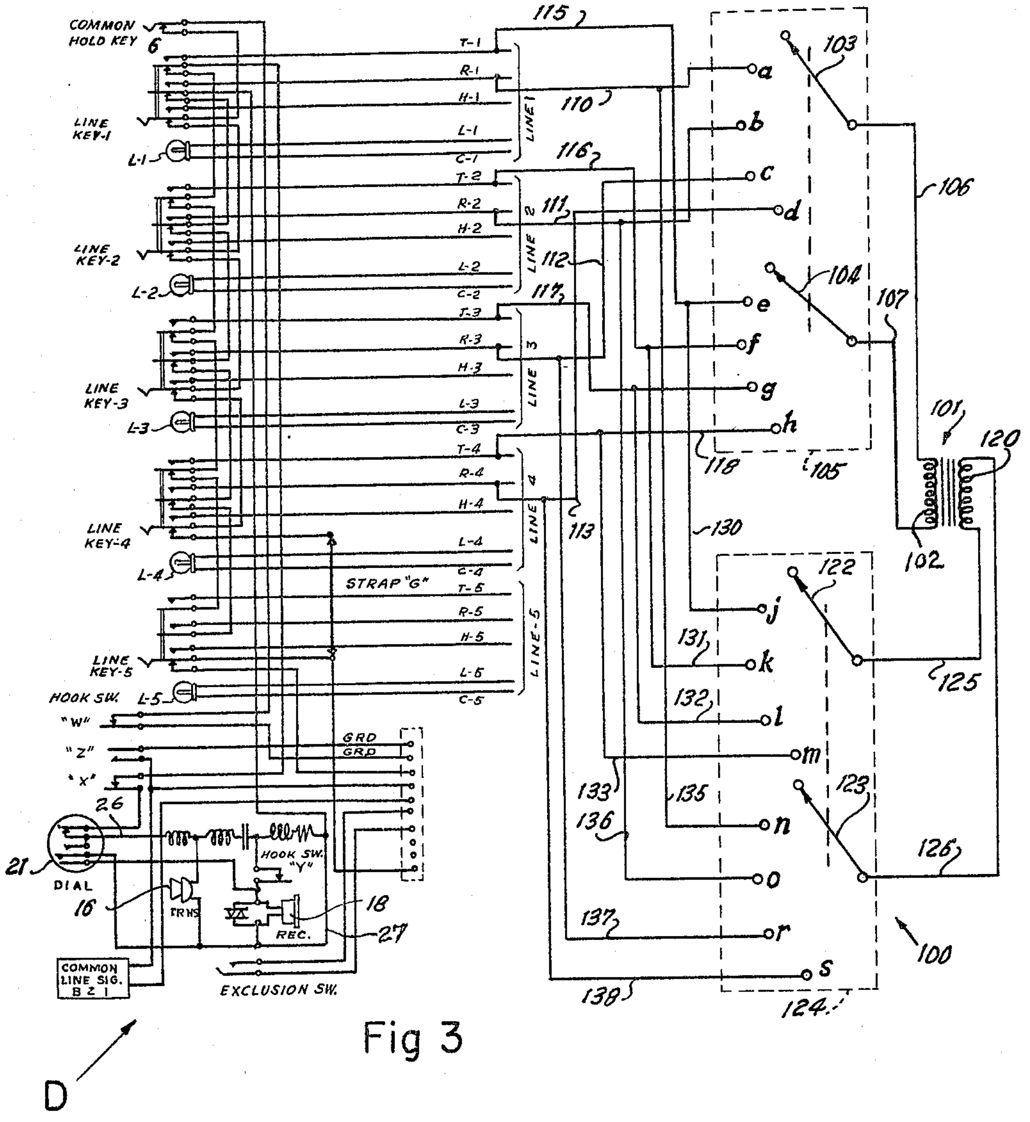
Figure 4:
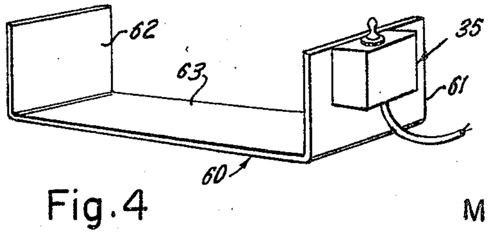

FIGURE 3 is a schematic circuit diagram of a station or instrument circuit, showing the instrument in the condition obtained with the handset off the cradle and the hook switch contacts operated, provided with the conference means embodying the invention for establishing a three-way conference connection between the subscriber at the instrument and parties on two lines terminating at the instrument; and, FIGURE 4 is a perspective view of the clamp for attaching the switch means of the conference means to the cradle of the instrument.

Figure 1:
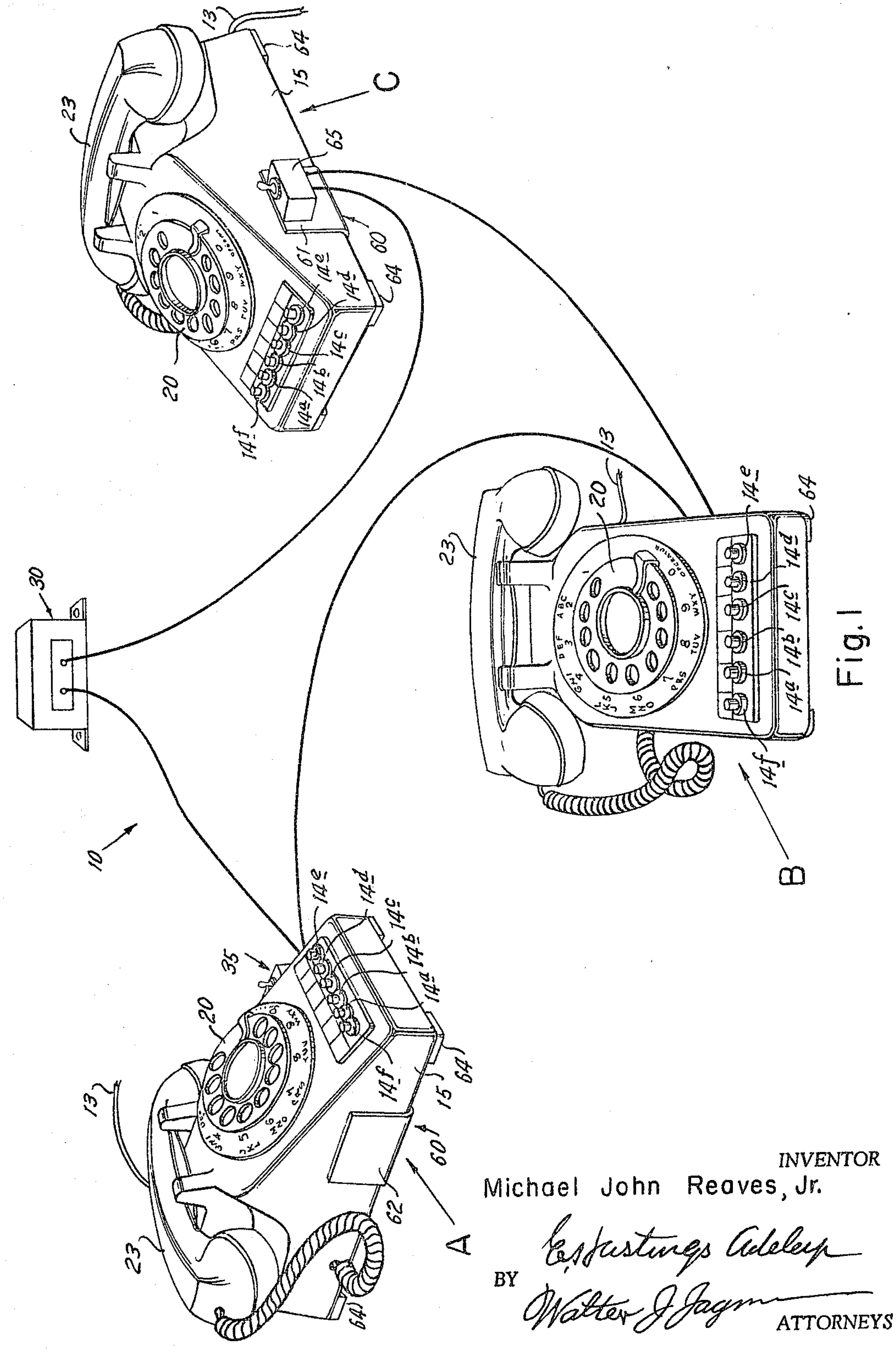
FIGURE 1 is a schematic illustration showing a plurality of common subscriber stations having a plurality of lines provided with the conference means embodying the invention for enabling a subscriber employing two of the stations or instruments to establish a conference call between himself and parties on two different lines terminating at such stations.
Figure 2:
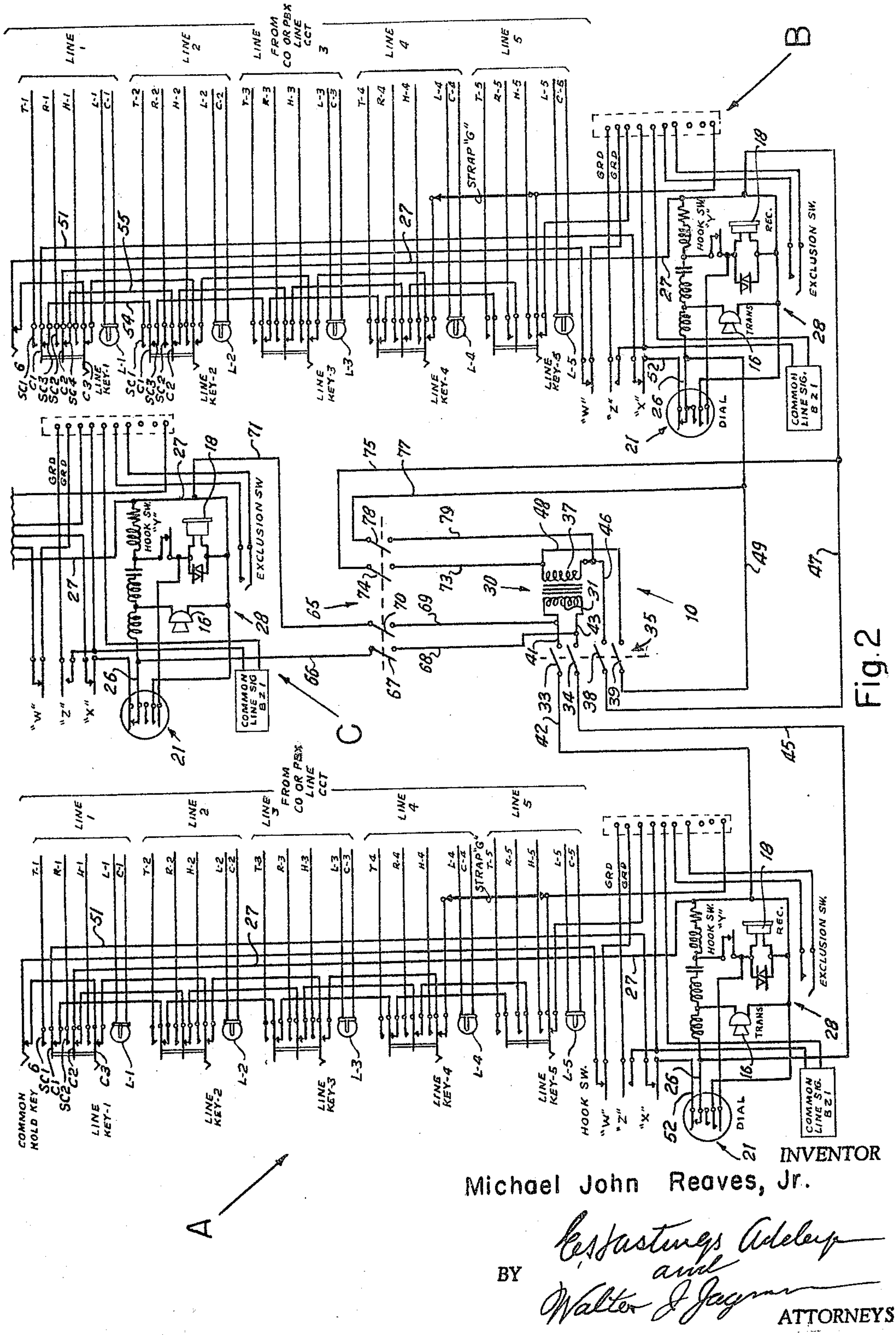
FIGURE 2 is a fragmentary schematic illustration of the system illustrated in FIGURE 1 showing the circuit of each station or instrument with the instrument in the condition obtained with the handset off the cradle and the hook switches operated.

Referring now particularly to FIGURES 1 and 2 of the drawing, the conference means embodying the invention is shown connected to the common stations or instruments A, B and C of the usual key telephone system, such as the one fully illustrated and described in the patent to R. K. Kaye et al., No. 2,845,492, and each has access to all of the telephone lines 1, 2, 3 and 4 and the common or intercom line 5. The incoming terminals and a number of apparatus units including a few relays or other switching devices of such telephone system, not shown, which provide the various functions requisite to the proper operation of such key telephone system are placed at some convenient and inconspicuous location on the subscriber's premises and a cable 13 from such location is multiplied to each such instrument or station.

Each of the instruments or stations may have a row of push buttons **14*a*, 14*b*, 14*c*, 14*d* and 14*e* mounted in the cradle 15 by which the subscriber may operate the line keys 1, 2, 3, 4 and 5 to connect the tip and ring conductors T and R of the lines 1 through 5, respectively, to the transmitter 16 and receiver 18 of the instrument. In general, these five buttons operate in an interlocking arrangement; that is, when one is operated it releases another previously operated. In addition, a push button 14*f* operates a common hold key 6 by means of which the operator at any such station may hold an incoming call on any one of the lines 1 through 4** while initiating or answering a call on any one of the other lines.

By way of example, if a person at instrument A answers a call on line 1 by pushing in the push button **14*a* to operate the line key 1 and then finds out that the call on line 1 is for another party at one of the other instruments or stations B or C, he may momentarily open the common hold key 6 by depressing the hold push button 14*f* to establish a holding circuit for line 1 of the instrument so that the calling party remains connected to the conductors T1 and R1 of the instrument A even though the line key 1 is released. The person at the instrument A then makes a call to another station, for example station B, by pushing the push button 14*e* and dialing a suitable code number by means of the dial 20 of the instrument in the usual manner to cause the bell at such station B to ring so that a second person at the station B may be called to the phone and depress his key 14*e* to establish communication with the party at the station or instrument A through line 5. Upon being informed that the call in line 1 is for him, the second person may depress his push button 14*a* which thus causes the party on the line 1 to be connected to the transmitter receiver circuit of instrument A. When the subscriber at the station B depresses his push button 14*a* he releases the holding circuit of conductors T1 and R1 at station A which had been established by the momentary depression or operation of the push button 14f of the instrument A. The key telephone system also permits persons at two or more of the stations A, B and C to hold a conversation with each other and a party on any single one of the lines 1 through 4, for example line 1, by each depressing or operating the push button controlling such line at his station, in this case the push buttons 14a. Any person or persons using any of the instruments A, B or C of such key telephone system cannot however simultaneously hold conversation with parties on any two lines 1, 2, 3 or 4**.

The cradle of each instrument also conventionally has the usual dial switch 21 which is controlled by the rotatable dial 20 and two buttons (not shown) which the handset 23 depresses when it is placed on the cradle. These handset depressed buttons operate a hook switch consisting of the contacts W, X, Y and Z, FIGURE 2. The handset of course is lifted from the cradle when a call is to be made from or answered at the instrument so that whenever any one of the keys 1 to 5 is actuated or depressed, the tip and ring conductors T and R of its associated line are connected to the common conductors 26 and 27, respectively, of the receiver and transmitter circuit 28 of such instrument whereby the audio signals from the transmitter of such instrument are transmitted to the tip and ring conductors of the line whose key is actuated and the incoming audio signals from such line are transmitted to the receiver of such instrument. Each of the push buttons, except the hold button, also has a lamp which gives a visual signal whenever its associated circuit or its associated line is in an operative condition or in a hold condition. The lamps are conventionally mounted in the cradle beneath the buttons which are made of a translucent substance.

The operation and circuitry of the above described telephone system is well known and the other circuitry thereof, which is fully explained in the patent to R. K. Kaye et al., No. 2,845,492, will not therefore be further described herein.

The conference means or circuit 10 for enabling a person at any one of such common subscriber stations or instruments, A, B or C to establish communication between himself and two other parties on any two of the lines 1 through 4 terminated at such instruments, includes an inductive means or transformer 30 having one winding 31 which is connectable across the receiver and transmitter circuit 28 of one of the instruments by means of the two contacts 33 and 34 of a quadruple pole single throw switch 35 and having a second winding 37 connected across the transmitter-receiver circuit 28 of another one of the instruments by the other two contacts 38 and 39 of such switch. For example, one side of the winding 31 may be connected by the conductor 41, the movable contact 33 and the conductor 42 to the common conductor 27 of the receiver and transmitter circuit 28 of the instrument A and the other side of the winding 31 may be connected by the conductor 43, the movable contact 34 and the conductor 45 to the other common conductor 26 of the receiver and transmitter circuit of the instrument A so that any audio signals induced in the winding 31 will be impressed across the receiver-transmitter circuit of station A and also across the tip and ring lines T and R of any line 1 through 5 whose key is in actuated position. Voltage fluctuations or audio signals produced at the instrument A across the common conductors 26 and 27 by a person speaking into the transmitter at that station and the audio signals from the conductors T and R of any one of the lines 1 through 4 connected to the receiver and transmitter circuit of the instrument A are also impressed across the transformer winding 31 and induce similar audio signals in the other transformer winding 37. The second winding 37 of the transformer 30 is similarly connected across the receiver and transmitter circuit 28 of the instrument B since one of its sides is connected to the common conductor 26 of instrument B through the conductor 46, the movable contact 38 and the conductor 47 and its other side is connected to the common conductor 27 of the instrument B by the conductor 48, the movable contact 39 and the conductor 49 so that any audio signals or voltage variations induced in the winding 37 are applied across the receiver and transmitter circuit 28 of the instrument B and also across the conductors T and R of any line 1 through 4 of the instrument B whose line key is in actuated position. Similarly any voltage fluctuations or audio signals produced at the instrument B by a person speaking into the transmitter at the station B and any audio signals from the conductors T and R connected to the receiver and transmitter circuit of the instrument B are applied across the winding 37 and induce similar audio signals in the winding 31.

It will thus be apparent that when the switch 35 is in closed position, a person at either the instrument A or the instrument B may engage in a three party conversation or conference with two other parties one of whom is connected to one of the instruments A or B by one of the lines 1 through 4 and the other of whom is connected to the other of the instruments A and B by another of the lines 1 through 4. The handsets of both instruments must be off their cradles during such conference.

In use, if a person at station or instrument A is engaged in conversation with a party on line 1, for example, he has picked up the handset to cause the switches W, X, Y and Z to assume their operative positions illustrated in FIGURE 2 and has depressed or actuated the pushbutton 14a to connect the conductor T1 to the common conductor 26 through the stationary and movable contacts SC1 and C1, respectively, of the line key 1, the conductor 51, the switch X, the conductor 52 and a suitable contact of the dial switch 21 and to connect the line R1 to the common conductor 27 through the stationary and movable contacts SC2 and C2, respectively, of the line key 1. The movable contact C3 of the line key 1 controls in the usual manner the operation of the holding circuit. Since the conductors T1 and R1 of line 1 are now connected to the common conductors 26 and 27, and thus to the receiver and transmitter circuit 28 of the instrument A, the person at station A may carry on a conversation with a party on line 1.

If the person at the station or instrument A now decides to conduct a conference with the party on line 1 and a second party at another remote location, he picks up the handset of the station or instrument B, while maintaining the handset of instrument A off its cradle, depresses one of the pushbuttons 14b through 14d of the instrument B in order to use any line other than line 1, for example pushbutton 14b and thus line 2, dials the number of the second party in the usual manner so that when the second party answers, the conductors T2 and R2 are connected to the common conductors 26 and 27, respectively, of the receiver and transmitter circuit 28 of the instrument B. The conductor T2 is then connected to the common conductor 26 through the stationary and movable contacts SC1 and C1 of the line key 2, the conductor 54, the stationary and movable contacts SC3 and C1 of line key 1, the conductor 51, the hook switch X, the conductor 52 and a suitable contact of the dial switch 21. The conductor R2 of line 2 is connected to the common conductor 27 through the stationary and movable contacts SC2 and C2 of the line key 2, the conductor 55 and the stationary and movable contacts SC4 and C2 of the line key 1. When the third party answers at the remote location, the person operating the conference means or circuit 10 closes the switch 35 and the three parties may then carry on a conference since, if the person is using the handset of instrument A, the audio signals from the transmitter 16 of the station A and the incoming audio signals of line 1 are applied across the transformer winding 31 and thus induce similar audio signals in the transformer winding 37 which in turn are applied to receiver 16 of the instrument B thereof and also through the described elements or circuit of the instrument B to the conductors T2 and R2 of line 2. Conversely any audio signals from the transmitter of station B and from the lines T2 and R2 are applied across the transformer winding 37 to induce similar audio signals in the transformer winding 31 which in turn are applied to the receiver 18 of instrument A and through the described elements or circuit of instrument A to the conductors T1 and R1 of line 1 so that the party on the line 1 connected to instrument A will hear and be heard by the party on the line 2 connected to the instrument B. The person employing the handset of either instrument A or instrument B hears and is heard by the parties on lines 1 and 2. The handsets of the two instruments A and B must be kept off their cradles during such conference. When the conference is terminated, the switch 35 is opened and the handsets of instruments A and B are replaced in their cradles. It will be apparent of course that, since the transformer windings 31 and 37 are connected across the common conductors 26 and 27 of the instruments A and B, respectively, calls on any of the four lines 1 through 4 of the instruments A and B may be interconnected by the person at the stations A or B so that a party on any of the lines 1 through 4 connected through its associated line key of one of the instruments A and B to its receiver and transmitter circuit may be connected with another party on another of the lines 1 through 4 connected through its associated line key of the other of the instruments A and B to its receiver and transmitter circuit.

The transformer windings, whose impedance is chosen to match the impedance of the lines, are connected to the instruments only when actually in use and do not therefore in any manner adversely affect the operation of the telephone system.

It will now be apparent that a very simple and inexpensive conference means or circuit has been illustrated and described for a key telephone system having a plurality of common subscriber stations or instruments, such as the instruments A, B and C, at each of which a plurality of telephone lines 1 through 4 terminate so that by the use of two of such instruments, the person using any one of the instruments may carry on a conference with parties on any two of such lines.

It will further be seen that a simple and inexpensive conference means or circuit has been illustrated and described which enables a subscriber having a plurality of common stations or instruments, such as the instruments A, B and C, at each of which a plurality of telephone lines terminate, to initiate and hold conference calls between parties on any selected two of the lines and that the conference means is easily connected to such instrument since only two conductors must be connected at appropriate terminals or points of the circuit of two such instruments.

The switch 35 may be attached to the cradle of the handset A or B in any desired manner, as by a suitable clamp, such as the clamp 60 having a pair of upstanding arms 61 and 62 which frictionally engage opposite sides of the cradle and a horizontal bar 63 which extends beneath the cradle between the usual spaced feet 64 of the cradle, so that no alteration or modification of the instrument is necessary when attaching the switch thereto. The switch may be secured to the arm 61. The transformer 30 may also be attached to such cradle by the clamp 60, in which case it may be secured to the other arm 62 of the clamp. The transformer may also of course be located at any other suitable location, as at the side of a desk and be secured thereto, if desired, by any suitable means, such as screws, bolts or clamps.

If it is desired that a person employing a third station or instrument C of the system also be able to hold conference calls on any two of the lines 1 through 4, the instrument C is provided with a switch 65, identical with switch 35, so that its receiver and transmitter circuit 28 may be connected across the winding 31 of the transformer 30 by means of the conductor 66, switch contact 67, conductors 68, 43, 41 and 69, movable contact 70 and the conductor 71. The transformer winding 37 may be connected across the receiver and transmitter circuit of the instrument B through the conductors 48 and 73, the contact 74, the conductors 75, 47, 49 and 77, the movable contact 78 and the conductors 79 and 46. It will be apparent that a person using the instrument C may also engage in a conference with two remote parties by using one instrument B or C to receive or place a call on one of the lines 1 through 4 and using the instrument B or C to place or receive another call on another of the lines 1 through 4, and then closing the switch 65.

It will be apparent that as is usual in such telephone systems any number of the instruments may be connected to any one of the lines 1 through 4 by depressing or actuating the pushbutton of such line at such instruments even though such line is connected to another line by the conference circuit. For example, another person at the instrument C can join a conference being held by a person at the instrument A who is connected to one party on one line, for example line 1, by means of the instrument A and to a second party on another line, for example line 2, by means of the instrument B, by depressing either the pushbutton 14*a* or the pushbutton 14*b* of the instrument C.

Referring now particularly to FIGURE 3 of the drawings, the modified form of the conference means or circuit is connectable to a single station or instrument of the usual key telephone system, such as the type illustrated and described in the patent to R. K. Kaye et al., 2,845,492, which may include a plurality of common subscriber stations or instruments, such as the instruments A, B, C and D, each having four lines terminating thereat, to enable a person using a single instrument, such as the instrument D, to engage in a conference with two remote parties on any two of the lines 1 through 4.

The conference means 100 includes a transformer 101 opposite sides of whose winding 102 are connected to the movable contacts 103 and 104 of the switch 105 by means of the conductors 106 and 107, respectively. The two contacts are mechanically linked or connected whereby they are both either in their open positions or are in any one of their several operative positions wherein they engage their complementary stationary contacts *a* and *e*, *b* and *f*, *c* and *g*, or *d* and *h*, respectively. The ring conductors R1, R2, R3 and R4 of the lines 1, 2, 3 and 4 are connected to the stationary contacts *a*, *b*, *c* and *d*, respectively, by the conductors 110, 111, 112 and 113 while the tip conductors T1, T2, T3 and T4 of the lines 1, 2, 3 and 4, respectively, are connected to the contacts *e*, *f*, *g* and *h* by means of the conductors 115, 116, 117 and 118, respectively. The conductors from the stationary contacts are of course connected at suitable terminals or points in the cradle of the instrument to their respective tip and ring conductors. It will thus be apparent that if the switch 105 is moved to a position wherein its contact 103 engages the stationary contact *a* and its contact 104 engages the stationary contact *e*, one side of the transformer winding 102 is connected to the conductor T1 of line 1 and its other side is connected to the conductor R1 of line 1 so that any audio signals or voltage fluctuations of line 1 caused by a party on the line 1 at a remote location, or by the party at the instrument D speaking into the transmitter 16 of the instrument D if the line key 1 is in its actuated position, are applied across the winding 102 and induce similar audio signals in the winding 120 of the transformer.

It will further be noted that when the mechanically linked contacts 103 and 104 are in positions engaging the contacts *b* and *f*, *c* and *g*, and *d* and *h*, respectively, the transformer winding 102 is connected across the lines T2 and R2, T3 and R3 and T4 and R4, respectively. It will thus be apparent that by the provision of a switch having the two movable contacts, the winding 102 may be selectively connected at the instrument D across the tip and ring conductors of any of the lines 1, 2, 3 and 4.

Opposite sides of the transformer winding 120 are connected to the mechanically linked movable contacts 122 and 123 of another switch 124 by means of the conductors 125 and 126. The movable contact 122 is engageable with the contacts *j, k, l* and *m* and the movable contact 123 is similarly engageable with the stationary contacts *n, o, r* and *s*. The tip conductors T1, T2, T3 and T4 of the lines 1, 2, 3 and 4 are connected at the instrument D to the stationary contacts *j, k, l* and *m*, respectively, by means of the conductors 115 and 130, 116 and 131, 117 and 132, and 118 and 133, respectively, while their ring conductors R1, R2, R3 and R4 are connected to the stationary contacts *n, o, r* and *s*, respectively by the conductors 110 and 135, 111 and 136, 112 and 137, 113 and 138, respectively. It will thus be apparent that if the switch 124 is moved to the position wherein its movable contact 122 engages a stationary contact *j, k, l* or *m* to connect one side of the winding to the tip conductor of a particular line, its movable contact 123 simultaneously engages a stationary contact *n, o, r* or *s* to connect the other side of the winding 120 to the ring conductor of that line. For example, if the switch 124 is moved to a position wherein its contacts 122 and 123 engage the stationary contacts *k* and *o*, respectively, the secondary winding 120 is connected across the tip and ring conductors T2 and R2 of line 2. When the movable contacts of the switch 124 are in this position, any audio signals or voltage fluctuations of line 2 caused by a party on the line 2 at a remote location and, if the line key 2 is in actuated position, by the person at the instrument D speaking into the transmitter of the instrument, are applied across the winding 120 and induce similar audio signals in the winding 102 of the transformer.

In use, if a person at the station or instrument D desires to receive or make a call, for example, on line 1, he lifts the handset of the instrument D from its cradle and actuates the line key 1 by depressing its associated pushbutton 14*a* and, if making the call, dials the number of the desired first party and will then be able to carry on a conversation with the first party on line 1. Should the person on line D thereafter desire to add a second party to the conversation over another line, for example, line 2, he first momentarily opens the hold key 6 of the instrument D by depressing the pushbutton 14*f* and then places the line key 2 in its actuated position by depressing its associated pushbutton 14*b*, and then dials the appropriate number of the second party. When the second party is on line 2, the person at the instrument D operates the switch 105 to move its contacts 103 and 104 into engagement with the contacts *a* and *e*, respectively, and operates the switch 124 to move its contacts to the positions wherein they engage their stationary contacts *k* and *o*, respectively. The winding 102 of the transformer 101 is thus connected across the tip and ring conductors T1 and R1 of line 1, which is still in a "hold" position, so that when the first party on line 1 speaks into the transmitter of his instrument, the audio signals or voltage fluctuations so transmitted across these conductors are applied across the winding 102 and induce similar audio signals in the winding 120 of the transformer 101. The switch 124 now connects the winding 120 across the tip and ring conductors T2 and R2 of line 2 and, since the line key 2 is now in its actuated position, also across the receiver and transmitter circuit 28 of the instrument D through the appropriate contacts of the line key and hook switch, so that any audio signals induced in the secondary winding 120 are applied across the receiver 18 of the instrument D and also across the tip and ring conductors of line 2 so that the second party on line 2 and the person at the instrument D will hear the party on line 1. Conversely, any audio signals produced by the conversation of the person employing the instrument D or the second party on line 2 are applied across the winding 120 and induce similar audio signals in the winding 102 which are applied across the tip and ring conductors T1 and R1 of line 1 so that the remote party on line 1 also hears the conversation of the second party on line 2 and the person employing the instrument D. In this manner each can hear the other two parties and each can be heard by the other two parties.

Should another person at the subscriber's premises wish to also enter the conference, he may employ another instrument, identical to the instrument D, such as the instrument A, B and C of FIGURE 1, at which the lines 1 through 4 are also terminated and actuate its line key 2 by depressing the associated pushbutton and will thus be interconnected by the usual key telephone system circuitry to line 2. Such other person will then be able to enter into the conversation being heard both by the person on the instrument D and the first and second parties on lines 1 and 2. Such other person at the subscriber's premises using such other instrument cannot of course actuate the line key 1 since this would remove the "hold" condition from line 1 at the instrument D and disconnect the party on line 1 from instrument D.

In the event that the subscriber has a plurality of instruments identical to instrument D at each of which the lines 1 through 4 are also terminated, the lamp at each such instrument associated with the line in holding condition at instrument D, such as the lamp L1 of line 1 and the line whose key is actuated at instrument D, such as the lamp L2 of line 2, will be energized and other persons at such other instruments will therefore be aware that lines 1 and 2 are in use and will not actuate the pushbuttons of these lines at such other instruments unless instructed to do so.

When the conference is over, the person at the instrument D first moves the switches 105 and 124 to their open positions wherein the windings of the transformer 101 are disconnected from all the lines and then depresses the pushbutton 14*a* to move the line key 1 into its actuated position breaking the hold condition of line 1 and, since the pushbuttons are interlocked, simultaneously moves the line key 2 to its inoperative position and thus breaks the connection with the party on line 2. The person at the instrument D then places the cradle back on the handset and this disconnects the instrument from the party on line 1 by the usual circuitry of the usual key telephone system.

It will now be apparent by use of the conference means or circuit 100, a subscriber who has one or more stations or instruments, each having a plurality of lines terminated thereat may himself establish by use of only one such instrument a conference between two other parties on any two of a plurality of lines terminated at such instrument without the necessity of any intervention by a central operator or P.B.X operator regardless of whether the subscriber himself has initiated either or both of the calls on the two lines since the subscriber can interconnect any two of the lines at any time remote parties are on such lines.

It will further be seen that the switches 105 and 124 may be easily attached to the cradle of the instrument D in the same or similar manner as the switch 35 of the conference means illustrated in FIGURES 1 and 2 so that the conference means for establishing and disconnecting the conference means is easily operated by the person using such instrument, and that the transformer 101 may be located either adjacent such instrument or at some location somewhat remote from the instrument, for example, it may be secured, by screws or bolts, to the vertical side of a desk on which the instrument is positioned and thus not take up any space on the desk.

It will now be seen that a new and improved conference means or circuit has been illustrated and described which is easily attached to an instrument without the necessity of running, in the case of the conference means 100, any conductors to any points other than the instrument merely by securing the requisite conductors leading from the switch of the conference means to the terminals of the ring and tip conductors at suitable terminals in the cradle of the instrument, or, in the case of the conference means or circuit 10 illustrated in FIGURES 1 and 2, merely by securing two conductors from the switch to appropriate terminals in the cradles of each of two instruments to permit connection of the two transformer windings through the switch 35 across the receiver and transmitter circuits 28 of the two instruments.

It will further be seen that the conference means is easily and quickly attachable to an instrument and is of simple, economical construction comprising only a transformer and a switch for connecting the transformer windings to suitable terminals or points of connection in the cradle of the usual telephone instrument at which a plurality of lines are terminated, the lines being connectable to the receiver and transformer circuit of the instrument through the usual line keys and hook switch mounted in the cradle, whereby the windings of the transformer may be selectively connected to two such lines at such instrument or instruments over which a conference with parties on the two lines is to be held by a person using the instrument to which the conference means is attached.

It will further be seen that the transformer windings are completely disconnected from the telephone lines when not in use so that the conference means does not in any manner interfere with the normal operation of the telephone system.

It will further be seen that a new and improved conference means for attachment to the usual instruments of a key telephone system has been illustrated and described which is easily operable by the person using the instrument to establish a conference connection between himself and two parties on two different lines without the necessity, and the delays attendant thereon, of calling a P.B.X or central operator to establish such conference call.

It will also be seen that if a subscriber or person having a station or stations to which the conference means 10 or the conference means 100 is connected is engaged in conversation with a first party on any one of the plurality of lines and receives an incoming call on another line from a second party, he may easily establish a three party conference with the two parties by use of such conference means, it being apparent that in the case of the conference means 100 the subscriber merely establishes a hold on the line on which he is connected with the first party before actuating the line key of the line having the incoming call and then actuates the switches 105 and 124 to connect the transformer windings across the two such lines; and that in the case of the conference means 100, if the subscriber is having a conversation with a first party on one line using the instrument A, B or C and an incoming call is received on another line, he answers such call by use of any other of the instruments A, B or C and then actuates the switch 35 or the switch 65 to connect the receiver and transmitter circuit of the instrument B with the receiver and transmitter circuit of the instrument A or C, respectively, as the case may be.

It will further be seen that the transformer of the conference means 100 is a means for connecting a line in holding condition across the receiver and transmitter circuit of the instrument through an actuated line key and the hook switch of the instrument since one of the windings is connected across such line and the other winding is connected across the line whose line key is actuated.

It will also be seen that the conference means 10 may also be employed by a subscriber having two stations or instruments with a single line terminated at each instrument, the two lines being different, since one transformer winding of the conference means is connectable across the receiver and transmitter circuit of one instrument, and therefore across one of the lines, and the other transformer winding is connectable across the receiver and transmitter circuit of the other instrument and therefore across the other of the two lines.

It will further be seen that the utility of the conference means is greatly enhanced by the availability of the so-called "area code system" whereby a subscriber may employ his own instrument to place not only local calls but also long distance calls instead of placing such long distance calls through a central operator.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. In a telephone system including an instrument having a receiver and transmitter circuit, a plurality of lines terminating at the instrument, holding means individual to each of said lines and operable at the instrument for placing holding conditions thereon, and key means for selectively and individually connecting said lines to said receiver and transmitter circuit: conference means operable at the instrument for operatively connecting one line held in holding condition by its associated holding means to said receiver and transmitter circuit while another line is connected by its associated key means to said receiver and transmitter circuit whereby a three party conference may be held between a party employing the instrument and the parties on the line held in holding condition and the line connected by its key means to said receiver and transmitter circuit, said conference means including a transformer having two windings, and switch means for selectively connecting one of said lines to said one of said windings and another of said lines to the other of said windings.

2. In a telephone system including an instrument having a receiver and transmitter circuit, a plurality of lines more than two in number terminating at the instrument, holding means individual to each of said lines and operable at the instrument for placing holding conditions thereon, and key means for selectively and individually connecting said lines to said receiver and transmitter circuit: conference means operable at the instrument for operatively connecting any one line held in holding condition by its associated holding means to said receiver and transmitter circuit while another line is connected by its associated key means to said receiver and transmitter circuit whereby a three party conference may be held between a party employing the instrument and the parties on the line held in holding condition and the line connected by its key means to said receiver and transmitter circuit, said conference means including a transformer having a pair of windings and switch means for selectively connecting one of said windings to one of said lines and the other of said windings to any other of said lines.

3. In a telephone system including an instrument having a receiver and transmitter circuit, a plurality of lines more than two in number terminating at the instrument, holding means individual to each of said lines operable at the instrument for placing holding conditions thereon, and key means for selectively and individually connecting said lines to said receiver and transmitter circuit: conference means operable at the instrument for operatively connecting any one line held in holding condition by its associated holding means to another line connected to said receiver and transmitter circuit by its associated key means whereby a three party conference may be held between a party employing the instrument, the party who is on the line held in holding condition and the party on the line connected by its key means to said receiver and transmitter circuit, said conference means including means connectable to said lines at said instrument for inductively coupling any selected two of said lines.

4. In a telephone system including an instrument having a receiver and transmitter circuit, a plurality of lines more than two in number terminating at the intsrument, holding means individual to each of said lines operable at the instrument for placing holding conditions thereon, and key means for selectively and individually connecting said lines to said receiver and transmitter circuit: conference means operable at the instrument for operatively connecting any one line held in holding condition by its associated holding means to another line connected to said receiver and transmitter circuit by its associated key means whereby a three party conference may be held between a party employing the instrument, the party who is on the line in holding condition and the party on the line connected by its key means to said receiver and transmitter circuit, said conference means including a transformer having two windings and switch means for selectively connecting any one of said lines at said instrument to one of said windings and any other of said lines to the other of said windings.

5. In a telephone system including an instrument having a receiver and transmitter circuit, a plurality of lines more than two in number terminating at the instrument, holding means individual to each of said lines operable at the instrument for placing holding conditions thereon, and key means for selectively and individually connecting said lines to said receiver and transmitter circuit: conference means operable at the instrument for operatively connecting any one line held in holding condition by its associated holding means to any other of said lines connected to said receiver and transmitter circuit by its associated key means whereby a three party conference may be held between a party employing the instrument, the party who is on the line in holding condition and the party on the line connected by its key means to said receiver and transmitter circuit, said conference means including a transformer having a pair of windings and switch means for connecting one of said windings to one of said lines at said instrument and the other of said windings to any other of said lines at said instrument, said switch means comprising a first pair of contacts for connecting one of said windings across one of said lines and a second pair of contacts for connecting the other of said windings across any other of said lines.

References Cited by the Examiner

UNITED STATES PATENTS 2,975,237 3/1961 Abbott ---------------- 179—99

References Cited by the Applicant

UNITED STATES PATENTS 2,154,579 4/1939 Parrott.
2,164,752 7/1939 Nyquist.
2,249,156 7/1941 Merrill.
2,303,015 11/1942 Beaumont.
2,810,016 11/1957 Knittle.
2,828,366 3/1958 Weston.
2,845,492 7/1958 Kaye et al.
2,871,291 1/1959 Horner.
2,912,503 11/1959 Grandstaff.
3,014,988 12/1961 McCreary.

KATHLEEN H. CLAFFY, *Primary Examiner*.

R. MURRAY, *Assistant Examiner*.